(12) United States Patent
Sano et al.

(10) Patent No.: US 11,880,596 B2
(45) Date of Patent: Jan. 23, 2024

(54) STORAGE SYSTEM FOR EFFECTIVELY WRITING DATA STORED IN A CLIENT TO A SERVER

(71) Applicant: Kioxia Corporation, Tokyo (JP)

(72) Inventors: Shintaro Sano, Kawasaki (JP); Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/199,756

(22) Filed: Mar. 12, 2021

(65) Prior Publication Data

US 2022/0083269 A1 Mar. 17, 2022

(30) Foreign Application Priority Data

Sep. 15, 2020 (JP) ................................. 2020-154697

(51) Int. Cl.
  *G06F 3/06* (2006.01)
  *G06F 12/1081* (2016.01)
  *G06F 13/16* (2006.01)
  *G06F 15/173* (2006.01)

(52) U.S. Cl.
  CPC .......... *G06F 3/0659* (2013.01); *G06F 3/0619* (2013.01); *G06F 3/0638* (2013.01); *G06F 3/0653* (2013.01); *G06F 3/0685* (2013.01); *G06F 12/1081* (2013.01); *G06F 13/1642* (2013.01); *G06F 15/17331* (2013.01)

(58) Field of Classification Search
  None
  See application file for complete search history.

(56) References Cited

U.S. PATENT DOCUMENTS

| 9,288,163 | B2* | 3/2016 | Arramreddy | ........... H04L 49/90 |
| 9,652,199 | B2 | 5/2017 | Vucinic et al. | |
| 9,658,782 | B2 | 5/2017 | Romem et al. | |
| 9,998,558 | B2 | 6/2018 | Sammatshetti | |
| 10,031,872 | B1* | 7/2018 | Friedman | .............. G06F 3/0613 |
| 10,331,600 | B1* | 6/2019 | Rajadnya | ............ G06F 12/0246 |

(Continued)

FOREIGN PATENT DOCUMENTS

JP 2021-81858 A 5/2021

OTHER PUBLICATIONS

Deierling, K. et al., "Ethernet Storage Fabrics—Using RDMA with Fast NVMe-oF Storage to Reduce Latency and Improve Efficiency," Storage Developer Conference (SDC), 2017, https://www.snia.org/sites/default/files/SDC/2017/presentations/Solid_State_Stor_NVM_PM_NVDIMM/Idan_BursteinEthernetStorageFabricsUsingRDMA withFastNVMeoFStorage.pdf, 27 pages.

*Primary Examiner* — Yaima Rigol
(74) *Attorney, Agent, or Firm* — Oblon, McClelland, Maier & Neustadt, L.L.P.

(57) ABSTRACT

According to one embodiment, a storage system includes a network interface controller, a volatile memory and a storage device. The network interface controller is configured to communicate with a client using remote direct memory access. The network interface controller is configured to store write data and a submission queue entry including a write request of the write data transferred using the remote direct memory access in the volatile memory. The storage device is configured to write, when the submission queue entry is stored in a submission queue of the volatile memory, the write data to the storage device based on the submission queue entry.

14 Claims, 10 Drawing Sheets

(56) References Cited

U.S. PATENT DOCUMENTS

| | | | |
|---|---|---|---|
| 2014/0304566 A1* | 10/2014 | Henderson | G06F 1/3275 |
| | | | 714/764 |
| 2015/0261434 A1* | 9/2015 | Kagan | G06F 13/28 |
| | | | 711/103 |
| 2015/0261720 A1* | 9/2015 | Kagan | G06F 13/4221 |
| | | | 709/212 |
| 2015/0347036 A1* | 12/2015 | Hunter | G11C 11/40611 |
| | | | 711/106 |
| 2017/0116117 A1* | 4/2017 | Rozen | G06F 12/0246 |
| 2017/0177541 A1* | 6/2017 | Berman | G06F 3/0656 |
| 2017/0322897 A1* | 11/2017 | Benisty | G06F 13/37 |
| 2018/0069923 A1 | 3/2018 | Tsalmon | |
| 2018/0113615 A1* | 4/2018 | Park | G06F 3/061 |
| 2018/0188975 A1* | 7/2018 | Benisty | G06F 3/0679 |
| 2018/0341429 A1 | 11/2018 | Bolkhovitin et al. | |
| 2019/0222649 A1 | 7/2019 | Cheng et al. | |
| 2020/0333975 A1* | 10/2020 | Benisty | G06F 3/0659 |
| 2021/0081115 A1* | 3/2021 | Clarke | G06F 3/0659 |
| 2021/0141751 A1* | 5/2021 | Kawamura | H04L 65/00 |
| 2021/0149599 A1 | 5/2021 | Kajihara et al. | |
| 2021/0397456 A1* | 12/2021 | Yang | G06F 3/0659 |

* cited by examiner

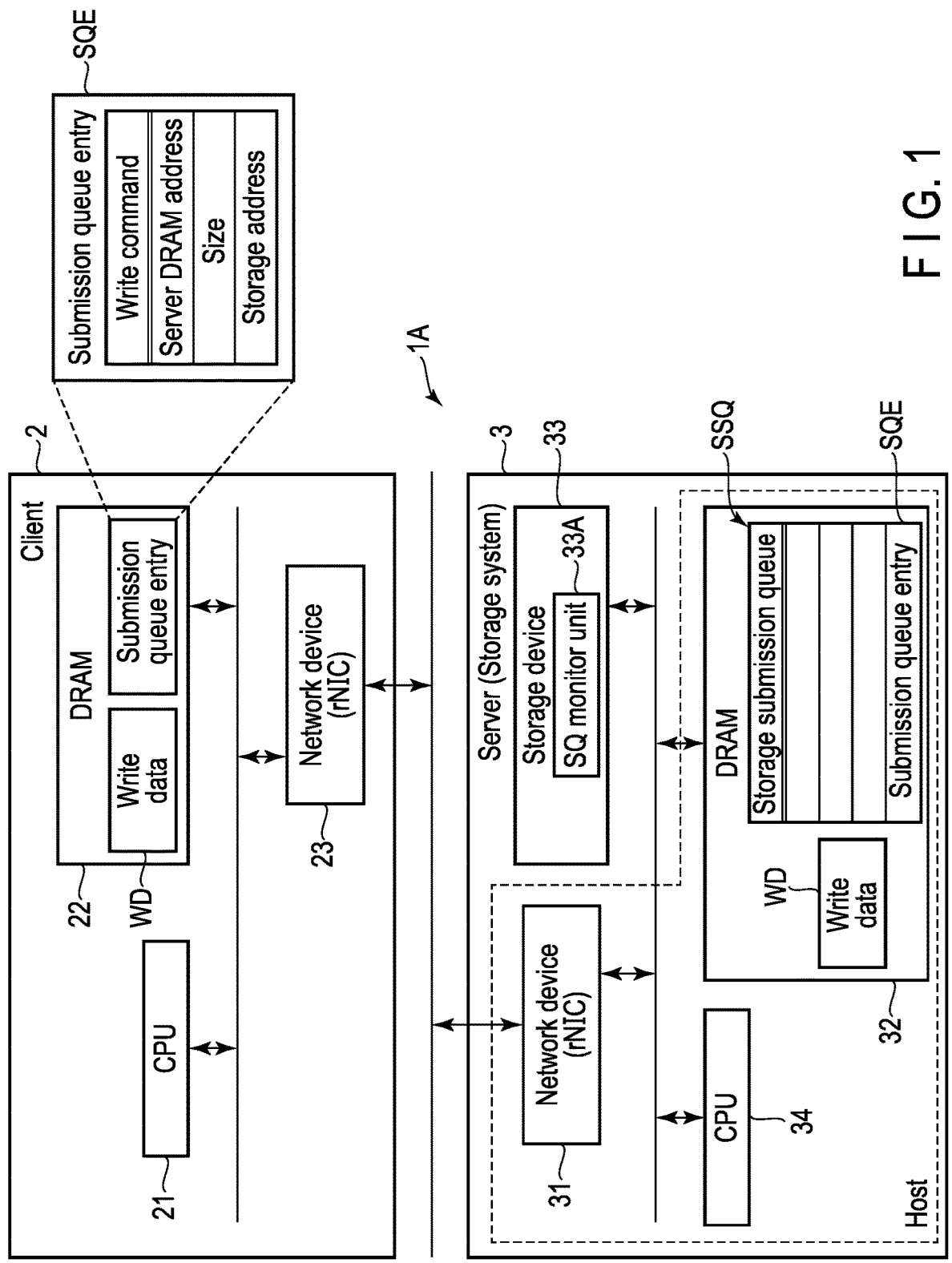
F I G. 1

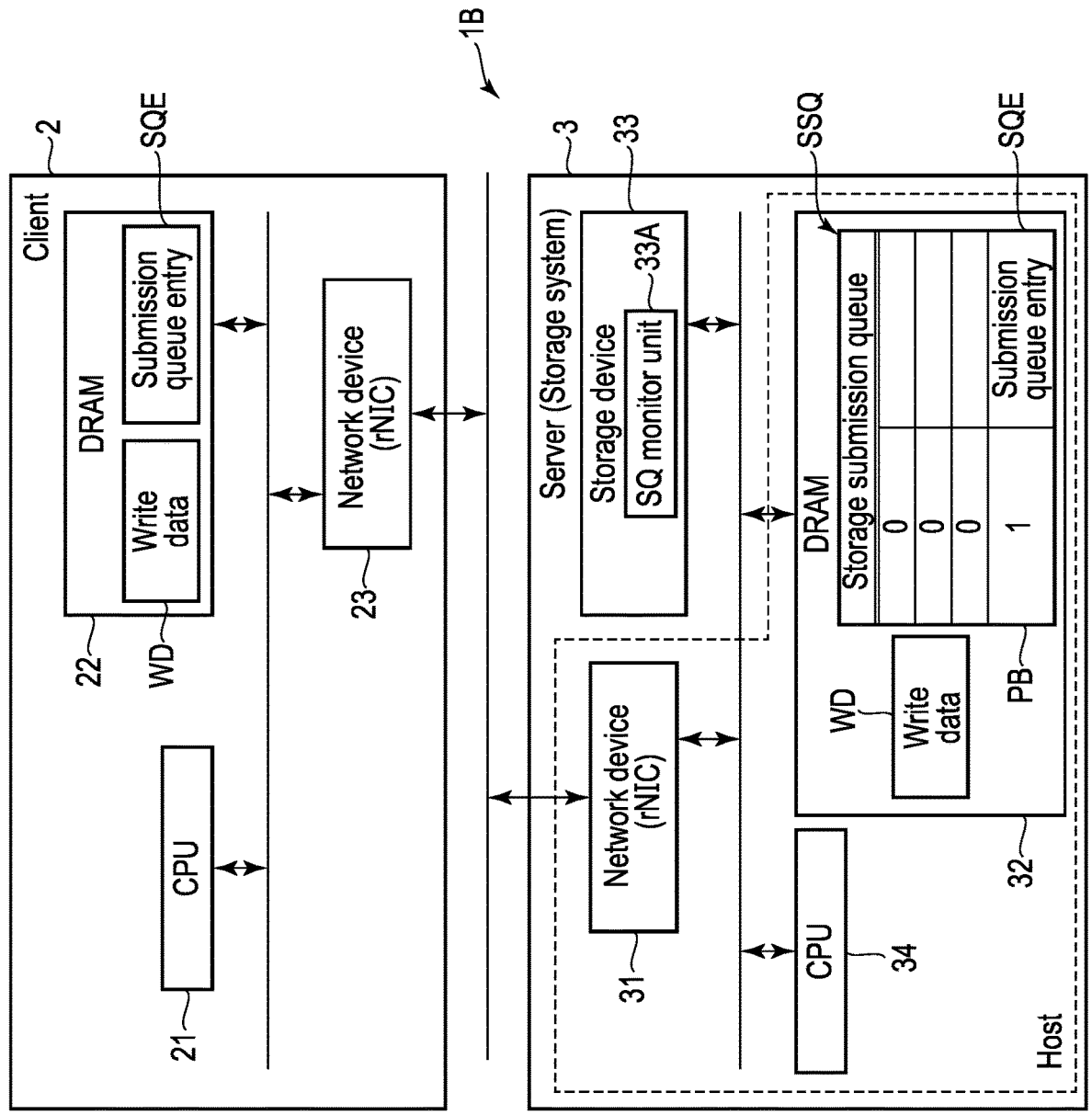
F I G. 3

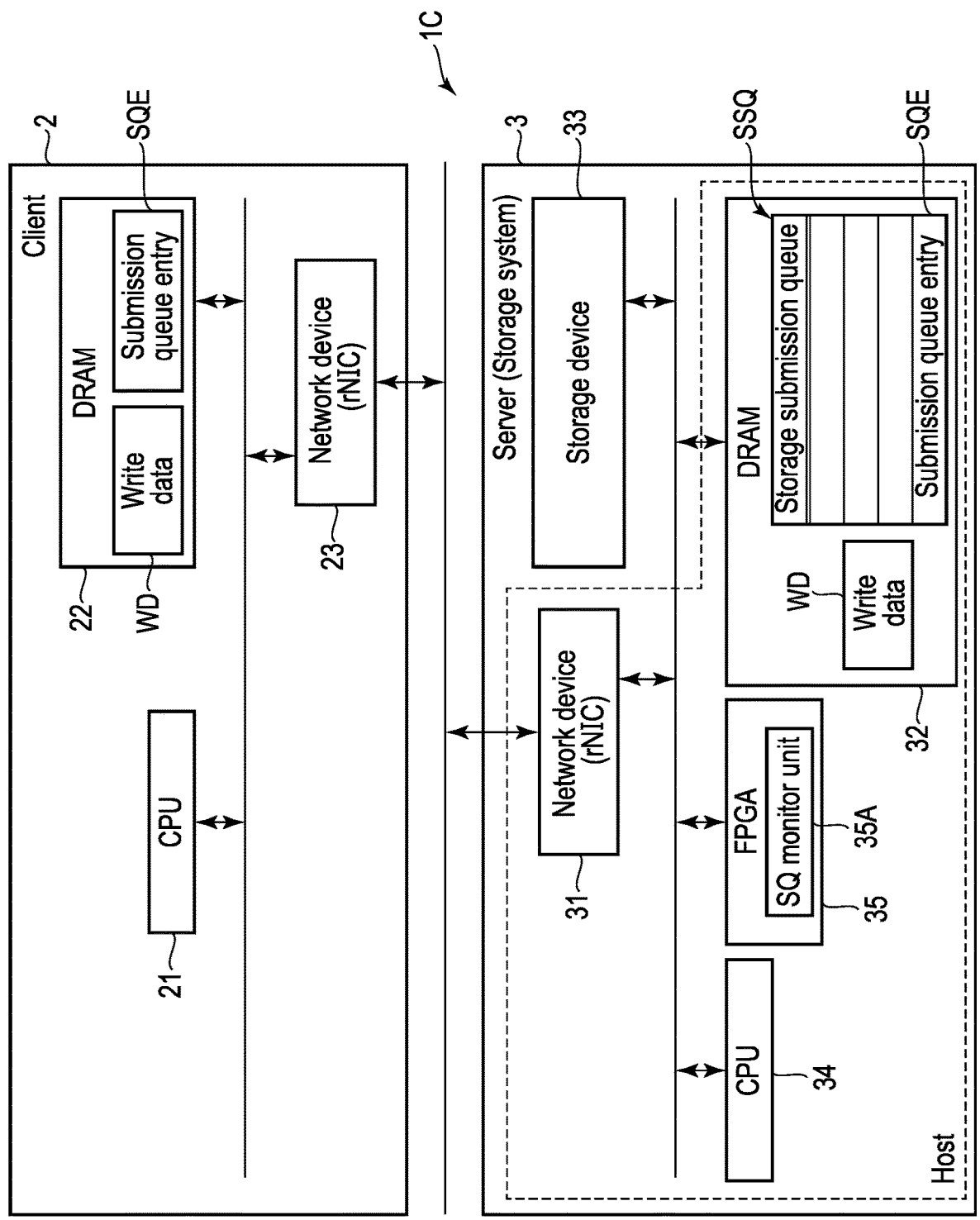
F I G. 4

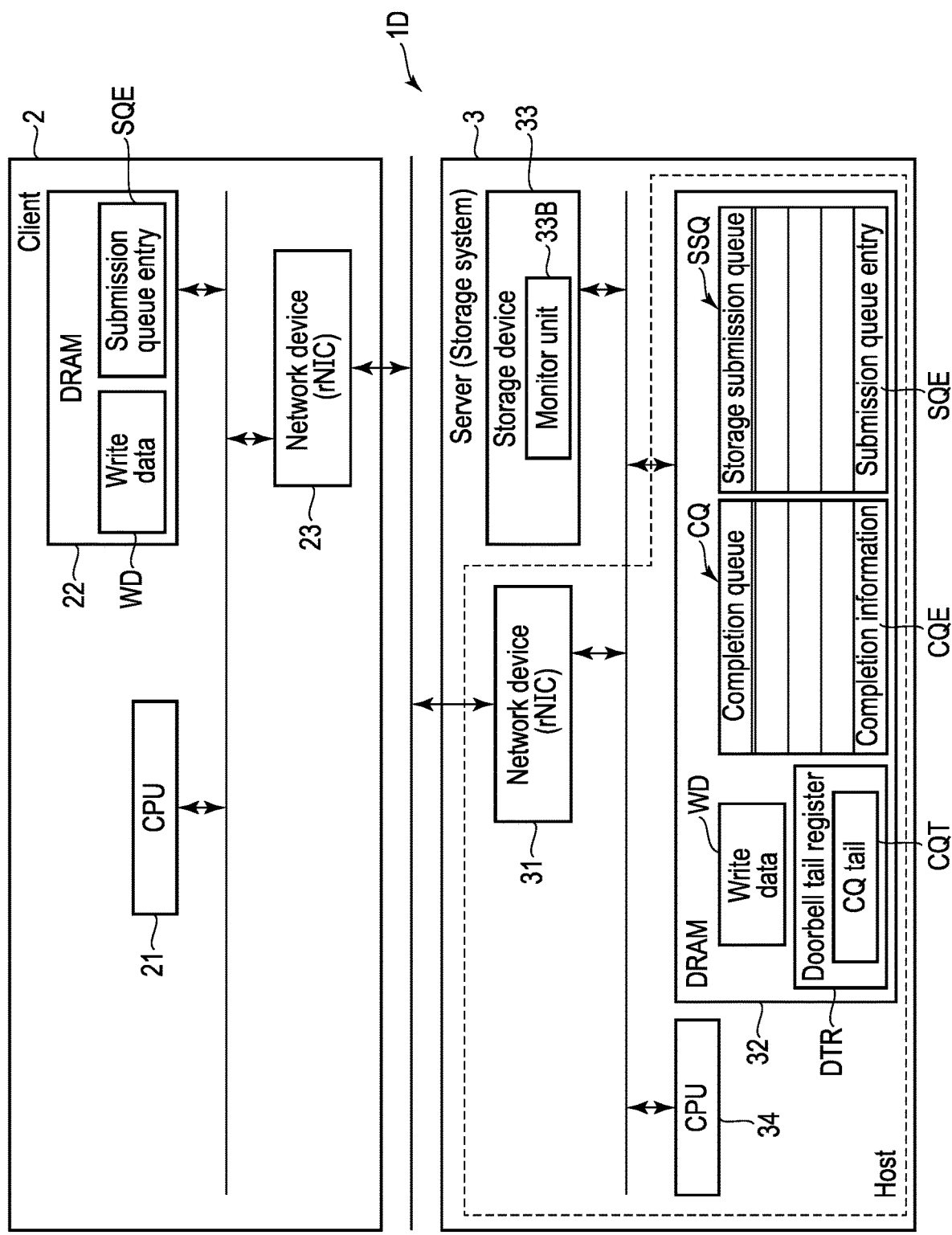
F I G. 5

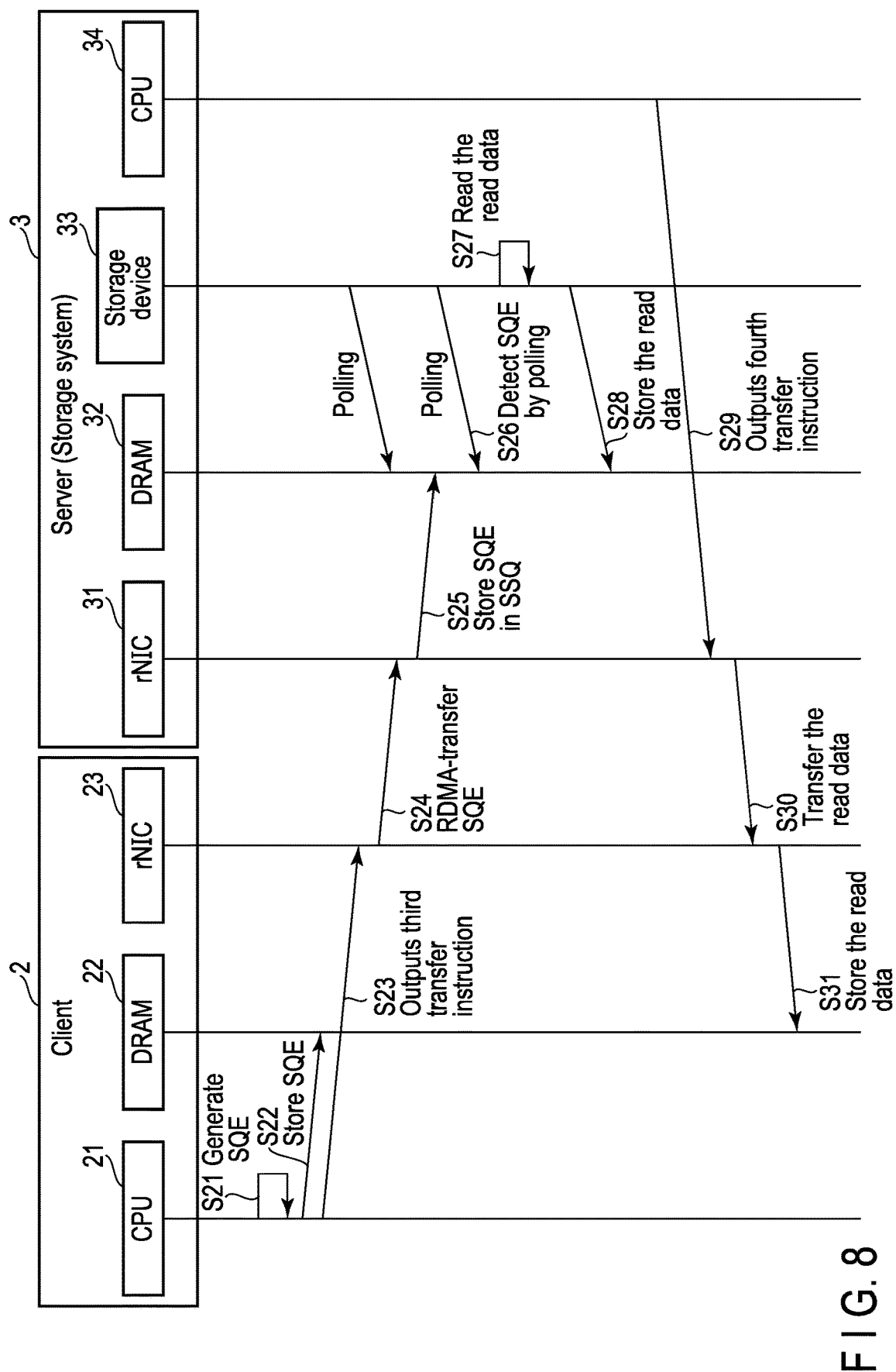
F I G. 8

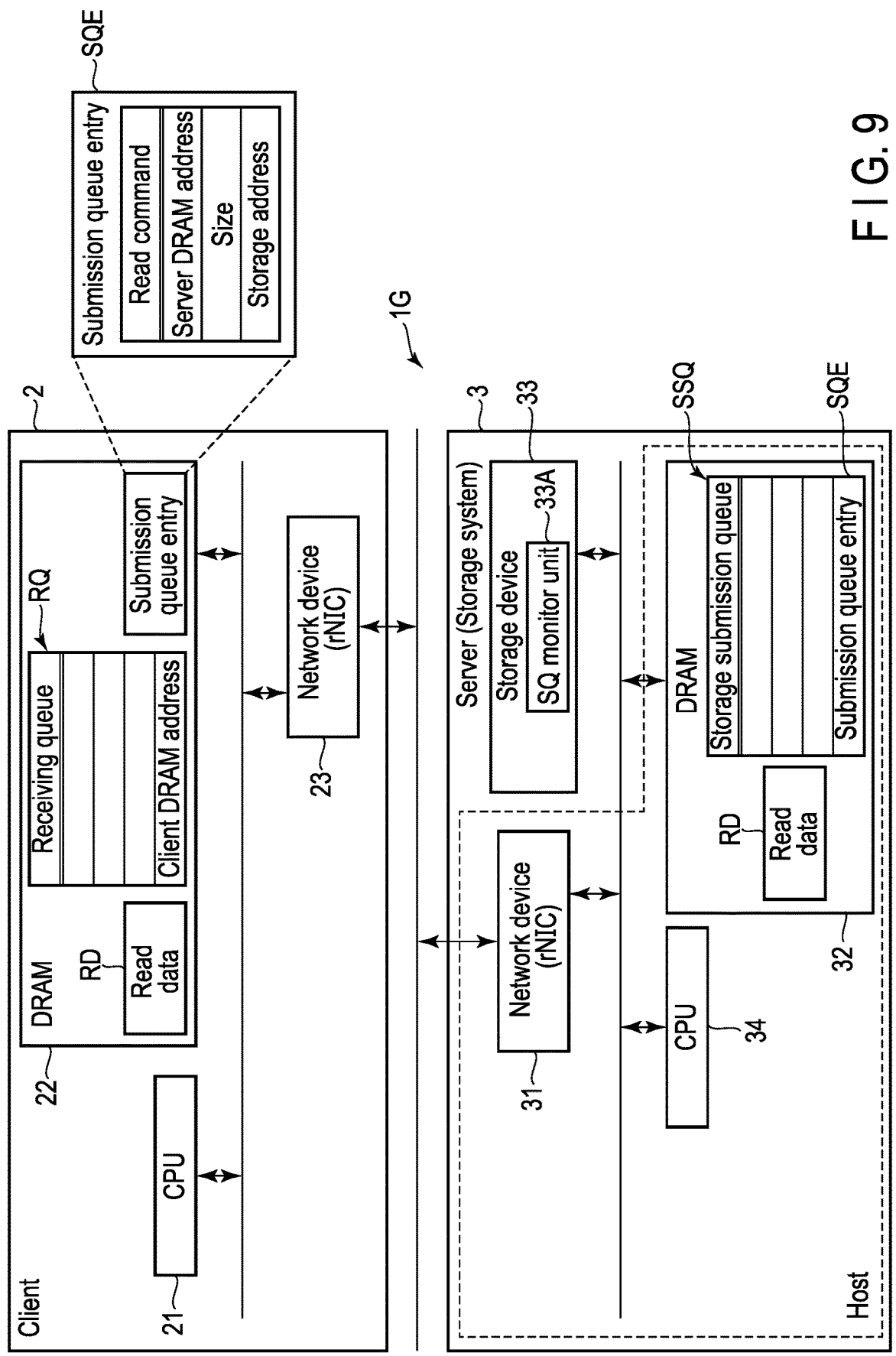
F I G. 9

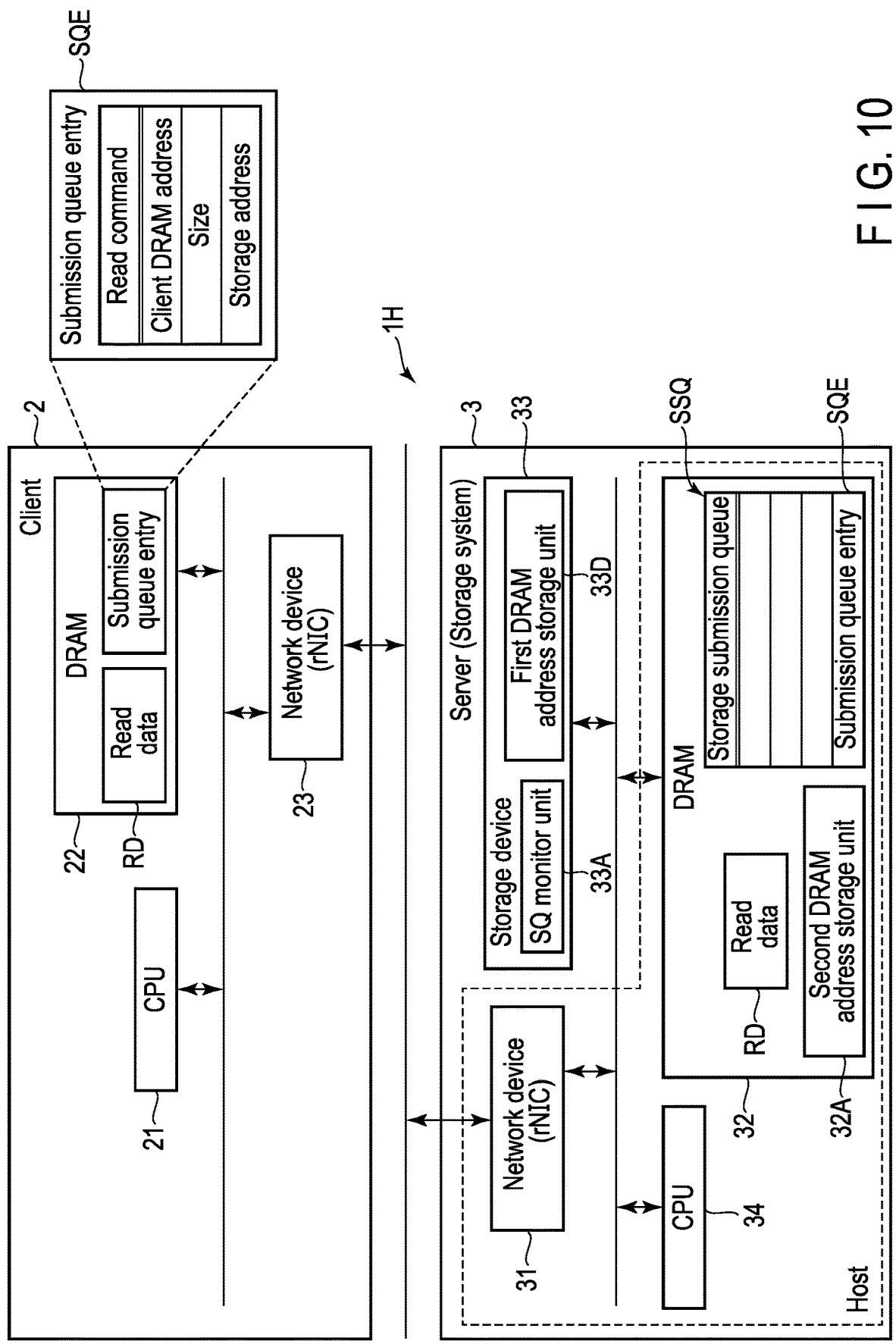
F I G. 10

STORAGE SYSTEM FOR EFFECTIVELY WRITING DATA STORED IN A CLIENT TO A SERVER

CROSS-REFERENCE TO RELATED APPLICATIONS

This application is based upon and claims the benefit of priority from Japanese Patent Application No. 2020-154697, filed Sep. 15, 2020, the entire contents of which are incorporated herein by reference.

FIELD

Embodiments described herein relate generally to a storage system.

BACKGROUND

Storage systems including a nonvolatile memory are widely used. As an example of the storage systems, a solid state drive (SSD) based on the NAND flash technique is known.

SSD is used as, for example, a storage device of a host computer system such as a server in a data center.

BRIEF DESCRIPTION OF THE DRAWINGS

FIG. 1 illustrates an example of the schematic structure of a network storage system of an embodiment 1-A.

FIG. 3 illustrates an example of the schematic structure of a network storage system of an embodiment 1-B.

FIG. 4 illustrates an example of the schematic structure of a network storage system of an embodiment 1-C.

FIG. 5 illustrates an example of the schematic structure of a network storage system of an embodiment 1-D.

FIG. 8 is a sequence chart of an example of the operation of the network storage system of the same embodiment.

FIG. 9 illustrates an example of the schematic structure of a network storage system of an embodiment 2-B.

FIG. 10 illustrates an example of the schematic structure of a network storage system of an embodiment 2-C.

DETAILED DESCRIPTION

Figure 2:
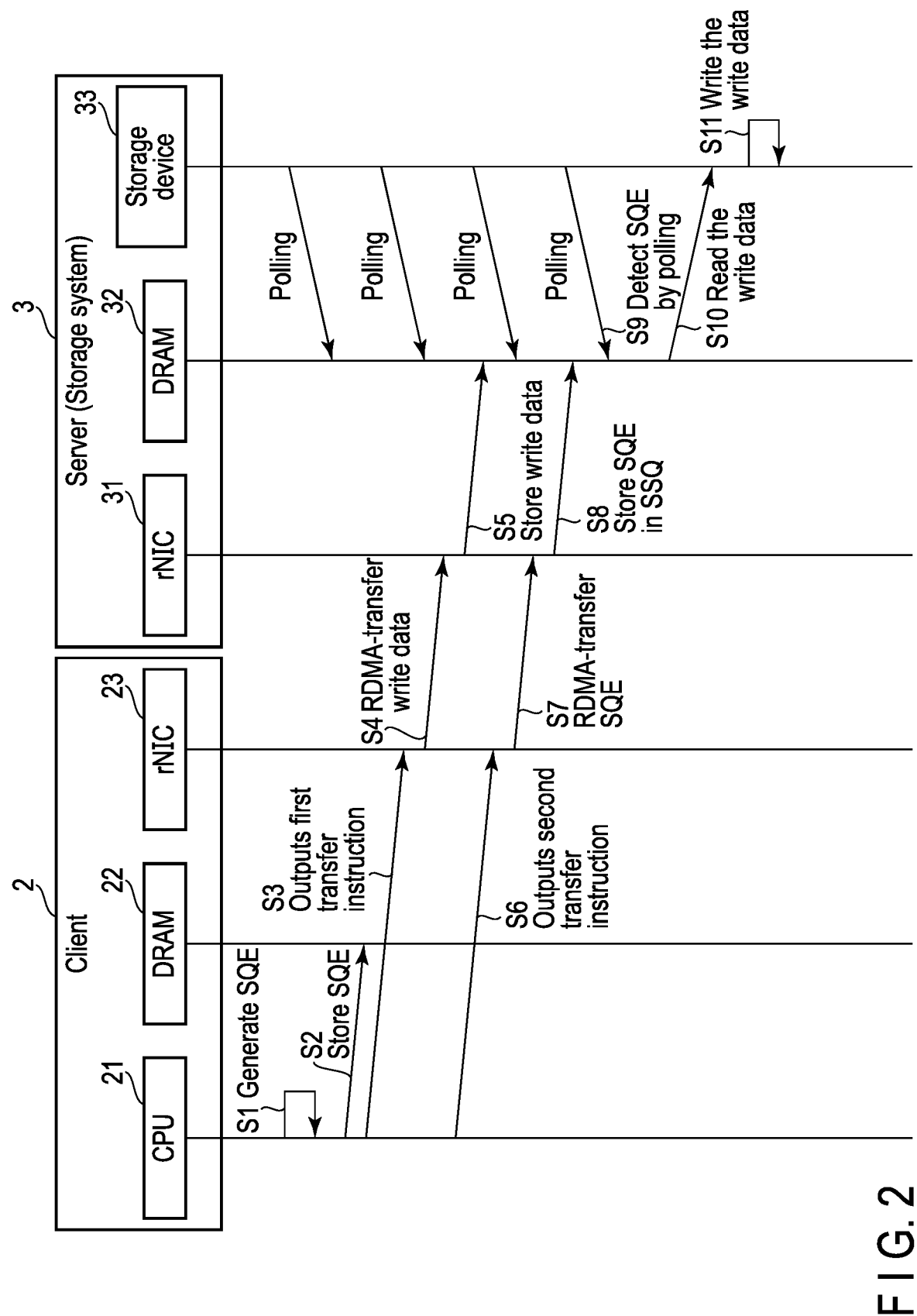
FIG. 2 is a sequence chart of an example of the operation of the network storage system of the same embodiment.

Embodiments will be described with reference to the accompanying drawings.

In general, according to one embodiment, a storage system includes a network interface controller, a volatile memory and a storage device. The network interface controller is configured to communicate with a client using remote direct memory access. The network interface controller is configured to store write data and a submission queue entry including a write request of the write data transferred using the remote direct memory access in the volatile memory. The storage device is configured to write, when the submission queue entry is stored in a submission queue of the volatile memory, the write data to the storage device based on the submission queue entry.

Embodiment 1-A

In embodiment 1-A, a network storage system configured to effectively write data stored in a client to a server will be explained.

FIG. 1 is a diagram illustrating an example of the schematic structure of a network storage system 1A of an embodiment 1-A. As in FIG. 1, the network storage system 1A includes a client 2 and a server 3. The client 2 and the server 3 communicate with each other using remote direct memory access (RDMA). The communication using remote direct memory access performed between the client 2 and the server 3 may be realized by, for example, Infiniband®, RDMA over Converged Ethernet (RoCE), or internet Wide Area RDMA Protocol (iWARP).

The client 2 includes central processing unit (CPU) 21, dynamic random access memory (DRAM) 22, and network device 23. The components 21 to 23 included in the client 2 are mutually connected by, for example, a bus. Note that the client 2 may be referred to as a client node.

The server 3 includes a network device 31, DRAM 32, storage device 33, and CPU 34. The network device 31, DRAM 32, and CPU 34 function as a host of the storage device 33. The components 31 to 34 included in the server 3 are mutually connected by, for example, a bus. As an interface to mutually connect the host and the storage device 33, PCI Express (PCIe)®, NVM Express (NVMe)®, or the like may be used. Note that the server 3 may be referred to as a storage system or an information processor.

Initially, the structure of the client 2 will be explained.

The CPU 21 generates a submission queue entry SQE including a request to the server 3. The submission queue entry SQE includes various commands. In the present embodiment, a case where a write command is included as one of the various commands will be explained. No limitation is intended thereby. Various commands may include many commands other than the write command.

The write command is a command to write the write data to the server 3, and the write command includes, for example, a server DRAM address, size of write data, and storage address. The server DRAM address indicates an address of DRAM 32 included in the server 3, and indicates a position in DRAM 32 in which the write data to be transferred using RDMA to the server 3 is temporarily stored. The storage address indicates an address of the storage device 33 included in the server 3, and indicates a position in the storage device 33 in which the write data to be transferred using RDMA to the server 3 is written.

Note that, since the submission queue entry SQE includes a request to the server 3 functioning as a storage system, it may be referred to as storage request. Or, since the submission queue entry SQE includes various commands, it may be referred to as command information.

The DRAM 22 is a volatile memory to store the submission queue entry SQE generated by CPU 21 and write data WD to be written to the server 3 by the write command included in the submission queue entry SQE.

The network device 23 communicates with the server 3 using remote direct memory access and transfers the submission queue entry SQE and the write data WD using RDMA to the server 3. Note that the network device 23 may be referred to as a remote network interface controller (rNIC).

Now, the structure of the server 3 will be explained.

The network device 31 communicates with the client 2 using remote direct memory access, and receives the submission queue entry SQE and the write data WD which are transferred using RDMA from the client 2. The received submission queue entry SQE is stored in the storage submission queue SSQ in the DRAM 32. The received write data WD is stored in a position of the memory area in the DRAM 32, designated by a server DRAM address included in the submission queue entry SQE. Note that the network device 31 may be referred to as a remote network interface controller (rNIC).

The DRAM 32 is a volatile memory, and includes a storage submission queue SSQ. The storage submission queue SSQ includes a memory area of multiple management units. The storage submission queue SSQ stores the submission queue entry SQE which is transferred using RDMA from the client 2. Furthermore, the DRAM 32 stores the write data WD which is transferred using RDMA from the client 2.

The storage device 33 is a nonvolatile memory, which may be, for example, a NAND flash memory chip (NAND flash memory die). Or, the storage device 33 may be a different nonvolatile semiconductor memory such as NOR flash memory, magnetoresistive random access memory (MRAM), phasechange random access memory (PRAM), or ferroelectric random access memory (FeRAM). For example, the storage device 33 may be a magnetic memory, or a three dimensional structure semiconductor memory.

The storage device 33 includes an SQ monitor unit 33A. The SQ monitor unit 33A performs polling of the storage submission queue SSQ in the DRAM 32 periodically in order to monitor whether or not a new submission queue entry SQE is stored in the storage submission queue SSQ. In a case where a result of the polling indicates that a new submission queue entry SQE is stored, the SQ monitor unit 33A fetches the write command included in the new submission queue entry SQE and executes a write process based on the write command.

In a case where there is no submission queue entry SQE stored in the storage submission queue SSQ, the SQ monitor unit 33A performs polling of the memory area in which a first submission queue entry SQE is stored periodically in order to monitor whether or not a new submission queue entry SQE is stored. In a case where a result of the polling indicates that a new submission queue entry SQE is stored in the memory area in which a first submission queue entry is stored, thereinafter, the SQ monitor unit 33A performs polling of the memory area in which a next submission queue entry SQE (second submission queue entry SQE) is stored periodically in order to monitor whether or not the new submission queue entry SQE is stored. As above, the SQ monitor unit 33A performs polling of nth memory area in the storage submission queue SSQ periodically in order to monitor whether or not a new submission queue entry SQE is stored, and when a new submission queue entry SQE being stored in the nth memory area is detected, thereinafter, the SQ monitor unit 33A performs the polling of n+1th memory area in the storage submission queue SSQ periodically in order to monitor whether or not a new submission queue entry SQE is stored.

Note that the SQ monitor unit 33A is to detect whether or not a new submission queue entry SQE is stored in the storage submission queue SSQ, and thus, may be referred to as a detector.

The CPU 34 controls the operation of each of the components 31 to 33. It is not an essential structure of the present embodiment. Thus, the detailed description thereof will be omitted.

In the following description, a write process executed by a network storage system 1A of the embodiment 1-A with the aforementioned structure will be explained.

FIG. 2 is a sequence chart illustrating an example of the write process executed by the network storage system 1A of the embodiment 1-A. Note that the DRAM 22 of the client 2 includes write data WD to be written to the server 3. Furthermore, in this example, the SQ monitor unit 33A included in the storage device 33 of the server 3 performs polling of the storage submission queue SSQ in the DRAM 32 periodically in order to monitor whether or not a new submission queue entry SQE is stored.

Initially, the CPU 21 of the client 2 generates a submission queue entry SQE including the write command to write the write data WD stored in the DRAM 22 to the server 3 (step S1), and stores the generated submission queue entry SQE in the DRAM 22 (step S2).

Then, the CPU 21 acquires a server DRAM address indicated by the write command included in the generated submission queue entry SQE. The CPU 21 outputs a first transfer instruction to perform RDMA transfer of the write data WD stored in the DRAM 22 to the server 3 to the network device 23 (step S3). In this example, the first transfer instruction output to the network device 23 includes, for example, a DRAM address indicative of the position in the DRAM 22 storing the write data WD, and a server DRAM address.

Upon receipt of the first transfer instruction from the CPU 21, the network device 23 performs RDMA transfer of the write data WD to the server 3 (step S4).

The network device 31 of the server 3 receives the write data WD and the server DRAM address transferred using RDMA from the network device 23 of the client 2, and stores the received write data WD in a position of the memory area in the DRAM 32, where is indicated by a transfer destination memory address designated by the network device 23 (in this example, server DRAM address) (step S5).

The CPU 21 of the client 2 outputs the first transfer instruction, and then, outputs a second transfer instruction to perform the RDMA transfer of the submission queue entry SQE stored in the DRAM 22 to the server 3 to the network device 23 (step S6). In this example, the second transfer instruction output from the network device 23 includes, for example, a DRAM address indicative of a position in the DRAM 22 storing the submission queue entry SQE.

The network device 23 receives the second transfer instruction from the CPU 21, and then, transfers the submission queue entry SQE using RDMA to server 3 (step S7).

Note that, FIG. 2 illustrates a case where step S6 is executed after the write data WD transferred using RDMA is stored in the DRAM 32 of the server 3. Step S6 may be executed before the write data WD transferred using RDMA is stored in the DRAM 32 of the server 3 as long as it is executed after the output of the aforementioned first transfer instruction.

The network device 31 of the server 3 receives the submission queue entry SQE transferred using RDMA from the client 2, and then, stores the received submission queue entry SQE in the storage submission queue SSQ in the DRAM 32 (step S8).

Thereinafter, when the polling is executed by the SQ monitor unit 33A of the storage device 33, the SQ monitor unit 33A detects that a new submission queue entry SQE is stored in the storage submission queue SSQ in the DRAM 32 (step S9).

Upon detection of a new submission queue entry SQE being stored, the SQ monitor unit 33A executes an operation based on the write command included in the new submission queue entry SQE (that is, write process). Specifically, initially, the SQ monitor unit 33A reads the write data WD stored in the DRAM 32 based on the server DRAM address included in the aforementioned write command (step S10). Then, the SQ monitor unit 33A writes the read write data WD in a position of the memory area in the storage device 33, designated by the storage address included in the aforementioned write command (step S11), and ends a series of the write process.

In the above-described embodiment 1-A, the network storage system 1A includes the client 2 configured to communicate with the server 3 using remote direction memory access, and to transfer the submission queue entry SQE including the write command and the write data WD to the server 3 using RDMA. Furthermore, the network storage system 1A includes the server 3 including the DRAM 32 including the storage submission queue SSQ storing the submission queue entry SQE transferred from the client 2 using RDMA, and the SQ monitor unit 33A which monitors whether or not a new submission queue entry SQE is stored in the storage submission queue SSQ by periodical polling.

With the above structure, the server 3 detects that a submission queue entry SQE transferred using RDMA is stored in the storage submission queue SSQ by polling, and based on the detection, executes the write process based on a write command included in the submission queue entry SQE. Thus, a process normally required, that is, a process of updating a doorbell tail register performed when a submission queue entry SQE is stored in the storage submission queue SSQ (in other words, a process of updating a pointer indicative of a position of the storage submission queue SSQ where the submission queue entry SQE is written) can be omitted, and latency can be reduced.

Furthermore, the submission queue entry SQE including the write command executed by the server 3 is generated remotely by the client 2, and the server 3 simply executes the write process based on the write command included in the submission queue entry SQE transferred using RDMA, and thus, for example, a CPU process of changing a request command transmitted from the client 2 for the server 3, and generating a request command for the server 3 can be omitted. That is, the CPU process by the CPU 34 of the server 3 can be reduced.

Note that the network device 23 of the client 2 included in the network storage system 1A and the network device 31 of the server 3 may be structured with standard rNIC which does not have a function to interpret NVEeoF, or may be structured with rNIC which has a function to interpret NVMeoF.

Embodiment 1-B

Now, an embodiment 1-B will be explained. FIG. 3 illustrates an example of the schematic structure of a network storage system 1B of the embodiment 1-B. In the embodiment 1-B, a storage submission queue SSQ includes a phase bit PB changed at each time when a new submission queue entry SQE is stored, and in this respect, the embodiment 1-B is different from the above-described embodiment 1-A. Furthermore, in the embodiment 1-B, an SQ monitor unit 33A detects that a new submission queue entry SQE is stored based on the phase bit PB of the storage submission queue SSQ, and in this respect, the embodiment 1-B is different from the above-described embodiment 1-A. Note that, in the following description, the points different from the above-described embodiment 1-A will be explained, and the description considered redundant will be omitted.

As in FIG. 3, a phase bit PB of the storage submission queue SSQ is set per memory area of multiple management units, and all is set to 0 initially. When a new submission queue entry SQE is stored in a predetermined memory area of the storage submission queue SSQ, the phase bit PB corresponding to the memory area changes from 0 to 1, or from 1 to 0. An SQ monitor unit 33A detects a change of the phase bit PB by polling, and monitors whether or not a new submission queue entry SQE is stored.

In the above-described embodiment 1-B, the storage submission queue SSQ includes a phase bit PB which changes at each time when a new submission queue entry SQE is stored, and thus, the SQ monitor unit 33A monitors the phase bit PB by polling in order to detect that a new submission queue entry SQE is stored.

In this case, a process of updating a doorbell tail register performed when a submission queue entry SQE is stored in the storage submission queue SSQ can be omitted as well, and as with the above-described embodiment 1-A, latency can be reduced. Furthermore, the submission queue entry SQE including the write command executed by the server 3 is generated remotely by the client 2, and the server 3 simply executes the write process based on the write command included in the submission queue entry SQE transferred using RDMA, and thus, the CPU process executed by the CPU 34 of the server 3 can be reduced as with the above-described embodiment 1-A.

Embodiment 1-C

Now, an embodiment 1-C will be explained. As in FIG. 4, in the embodiment 1-C, the server 3 further includes a field programmable gate array (FPGA) 35, and the FPGA 35 includes an SQ monitor unit 35A instead of the storage device 33, and in this respect, the embodiment 1-C is different from the above-described embodiment 1-A. Note that the embodiment 1-C is the same as the above-described embodiment 1-A except for the structure of the SQ monitor unit 35A included in the FPGA 35 functioning as the SQ monitor unit 33A of FIG. 1, and thus, the detailed description thereof will be omitted.

With the embodiment 1-C, the same advantages of the above-described embodiment 1-A can be achieved.

Note that, in the present embodiment, the structure corresponding to the SQ monitor unit 33A of FIG. 1 is included in the FPGA 35. The structure corresponding to the SQ monitor unit 33A may be provided with the CPU 34. Even in such a case, the same advantages of the above-described embodiment 1-A can be achieved.

Embodiment 1-D

Now, an embodiment 1-D will be explained. FIG. 5 illustrates an example of the schematic structure of a network storage system 1D of the embodiment 1-D. In the embodiment 1-D, as in FIG. 5, the DRAM 32 of the server 3 includes a completion queue CQ and a doorbell tail register DTR, and in this respect, the embodiment 1-D is different from the above-described embodiment 1-A. Furthermore, in the embodiment 1-D, the targets of polling are the completion queue CQ and the doorbell tail register DTR instead of the storage submission queue SSQ, and in this respect, the embodiment 1-D is different from the above-described embodiment 1-A. Note that, in the following description, the points different from the above-described embodiment 1-A will be explained, and the description considered redundant will be omitted.

The completion queue CQ includes a memory area of multiple management units. The completion queue CQ stores completion information CQE indicative of completion of the RDMA transfer of the submission queue entry SQE from the client 2 to the server 3. Note that, in the present embodiment, the completion queue CQ stores the completion information CQE indicative of the completion of the RDMA transfer of the submission queue entry SQE from the client 2 to the server 3 alone, and does not store completion information indicative of the completion of the RDMA transfer of write data WD from the client 2 to the server 3.

The doorbell register DTR stores a write pointer with respect to the completion queue CQ (hereinafter referred to as CQ tail) CQT (a value thereof, specifically). The CQ tail CQT is a pointer indicative of a position of the completion queue CQ to which the completion information CQE from the client 2 is written next.

A monitor unit 33B included in the storage device 33 performs polling of the completion queue CQ and the doorbell tail register DTR in the DRAM 32 periodically in order to monitor whether or not a new completion information CQE is stored in the completion queue CQ, and whether or not a value of the CQ tail CQT stored in the doorbell tail register DTR is updated (increased by increment). In a case where a result of the polling indicates that a new completion information CQE is stored and the value of the CQ tail CQT stored in the doorbell tail register DTR is updated, the monitor unit 33B recognizes that the new submission queue entry SQE is stored in the storage submission queue SSQ. As above, the monitor unit 33B detects that a new submission queue entry SQE is stored, and then, fetches the write command included in the new submission queue entry SQE, and executes a write process based on the write command.

Note that, in that case, the monitor unit 33B performs, while polling a doorbell tail register DTR, polling of the position of the completion queue CQ indicated by the CQ tail CQT stored in the doorbell tail register DTR, and monitors whether or not new completion information CQE is stored in the completion queue CQ, and whether or not the value of the CQ tail CQT stored in the doorbell tail register DTR is updates (increased by increment).

Furthermore, in the present embodiment, when the monitor unit 33B detects that new completion information CQE is stored and the value of the CQ tail CQT stored in the doorbell tail register DTR is updated based on a result of the polling, the monitor unit 33B recognizes that a new submission queue entry SQE is stored in the storage submission queue SSQ. No limitation is intended thereby. For example, when at least one of new completion information CQE being stored and the value of the CQ tail CQT being updated is detected, the monitor unit 33B may recognize that a new submission queue entry SQE is stored in the storage submission queue SSQ.

In the above-described embodiment 1-D, the server 3 includes the completion queue CQ and the doorbell tail register DTR in the DRAM 32. Furthermore, the server 3 includes the monitor unit 33B configured to perform polling of the completion queue CQ and the doorbell tail register DTR in the DRAM 32 periodically in order to monitor whether or not a new submission queue entry SQE is stored in the storage submission queue SSQ.

In that case, a process of updating a doorbell tail register performed when a submission queue entry SQE is stored in the storage submission queue SSQ (note that, it is not a process of updating a doorbell tail register DTR corresponding to a completion queue CQ but is a process of updating a doorbell tail register corresponding to a storage submission queue SSQ) can be omitted as well, and as with the above-described embodiment 1-A, latency can be reduced. Furthermore, the submission queue entry SQE including the write command executed by the server 3 is generated remotely by the client 2, and the server 3 simply executes the write process based on the write command included in the submission queue entry SQE transferred using RDMA, and thus, the CPU process executed by the CPU 34 of the server 3 can be reduced as with the above-described embodiment 1-A.

Embodiment 1-E

Figure 6:
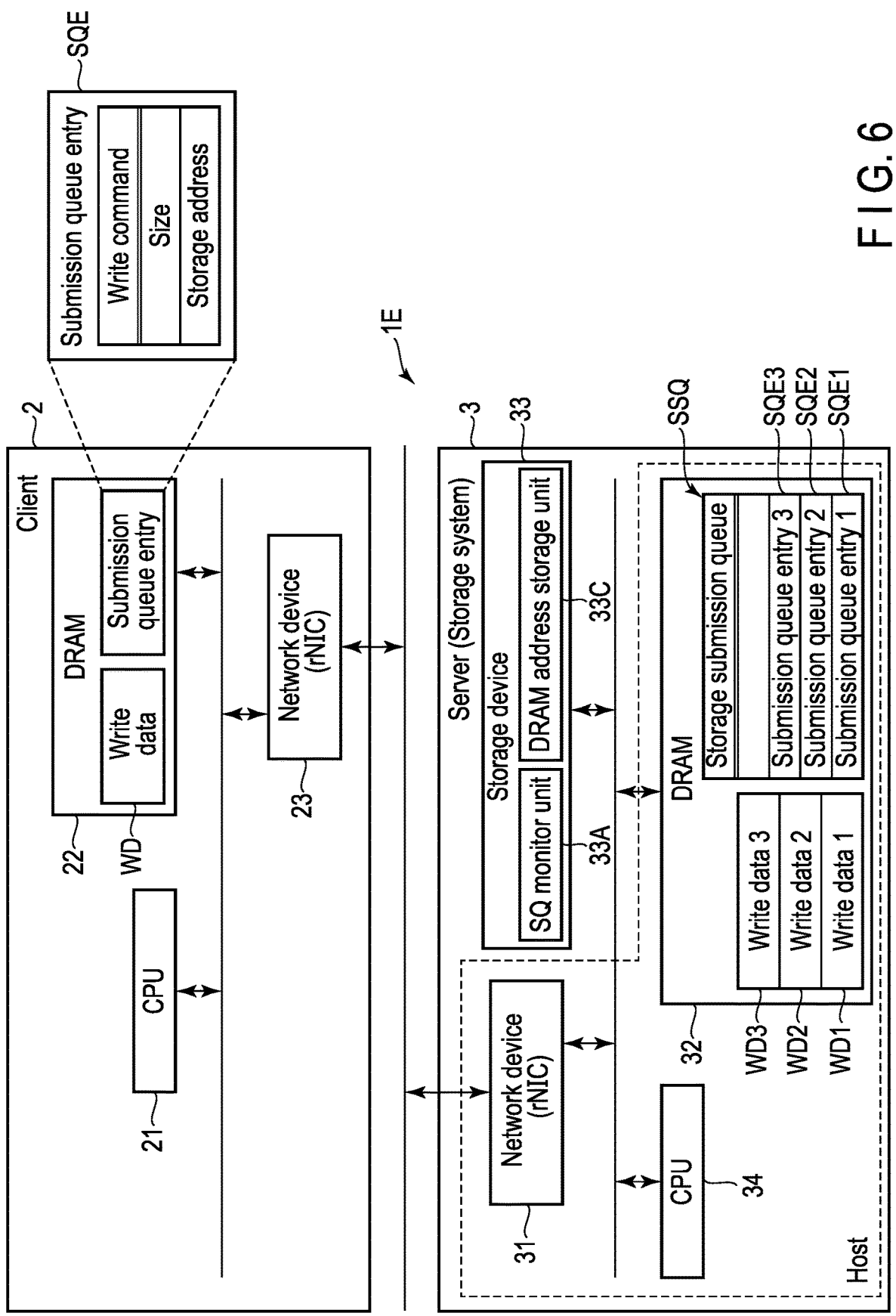
FIG. 6 illustrates an example of the schematic structure of a network storage system of an embodiment 1-E.

Now, an embodiment 1-E will be explained. FIG. 6 illustrates an example of the schematic structure of a network storage system 1E of the embodiment 1-E. In the embodiment 1-E, a server DRAM address indicative of a position of the DRAM 32 where first write data WD1 is stored is set by the CPU 21 of the client 2 while, as in FIG. 6, a server DRAM address is omitted from the submission queue entry SQE, and in this respect, the embodiment 1-E is different from the above-described embodiment 1-A. The server DRAM address set by the CPU 21 is transferred from the client 2 to the server 3, and is stored in a DRAM address storage unit 33C of the storage device 33. Note that, in the following description, the points different from the above-described embodiment 1-A will be explained, and the description considered redundant will be omitted.

The CPU 21 of the client 2 generates a server DRAM address indicative of a position of the DRAM 32 where the write data WD1 transferred first using RDMA from the client 2 to the server 3. The server DRAM address generated is transferred from the client 2 to the server 3, and is stored in the DRAM address storage unit 33C of the storage device 33.

A network device 31 of the server 3 communicates with the client 2 using remote direct memory access, and receives the first write data WD1 transferred from the client 2 using RDMA, and then, stores the write data WD1 in a position designated by the server DRAM address stored in the DRAM address storage unit 33C of the storage device 33.

The network device 31 communicates with the client 2 using remote direct memory access, and receives a submission queue entry SQE1 corresponding to the first write data WD1 transferred from the client 2 using RDMA, and then, stores the submission queue entry SQE1 in the storage submission queue SSQ in the DRAM 32. Furthermore, the network device 31 adds the size of the write data WD1 included in the received submission queue entry SQE1 to the server DRAM address stored in the DRAM address storage unit 33C of the storage device 33 in order to generate a server DRAM address indicative of a position of the DRAM 32 where write data WD2 transferred next using RDMA is to be stored. The generated server DRAM address is stored by updating the server DRAM address stored in the DRAM address storage unit 33C, for example.

The network device 31 receives the second write data WD2 transferred from the client 2 using RDMA, and then, stores the write data WD2 in a position of the memory area of the DRAM 32, designated by the server DRAM address stored in the DRAM address storage unit 33C of the storage device 33.

Upon receipt of a submission queue entry SQE2 corresponding to the second write data WD2 transferred from the client 2 using RDMA, the network device 31 stores the submission queue entry SQE2 in the storage submission queue SSQ in the DRAM 32. Furthermore, the network device 31 adds the size of the write data WD2 included in the received submission queue entry SQE2 to the server DRAM address stored in the DRAM address storage unit 33C of the storage device 33 in order to generate a server DRAM address indicative of a position of the DRAM 32 where write data WD3 transferred next using RDMA is to be stored. The generated server DRAM address is stored by updating the server DRAM address stored in the DRAM address storage unit 33C.

Note that the network device 31 operates similarly when third write data WD3 is transferred using RDMA as in a case where the first write data WD1 and the second write data WD2 are transferred using RDMA, and the detailed description thereof will be omitted.

With the above-described embodiment 1-E, a server DRAM address of first write data WD1 is set by the client 2, and thus, the server 3 can specify server DRAM addresses of second and subsequent write data WD based on the server DRAM address of the first write data WD1 and the size of the write data WD1. Thus, a server DRAM address can be omitted from the submission queue entry SQE, and transfer of the server DRAM address from the client 2 to the server 3 can be omitted. Therefore, data amount of the submission queue entry SQE can be decreased, and latency can further be reduced.

Note that, the submission queue entry SQE including the write command executed by the server 3 is generated remotely by the client 2, and the server 3 simply executes the write process based on the write command included in the submission queue entry SQE transferred using RDMA, and thus, the CPU process executed by the CPU 34 of the server 3 can be reduced as with the above-described embodiment 1-A.

According to the above-described embodiments 1-A to 1-E, a network storage system 1 which can write the write data WD stored in the client 2 to the server 3 with efficiency can be achieved.

Embodiment 2-A

In an embodiment 2-A, a network storage system 1 which can transfer the data stored in the server 3 to the client 2 with efficiency will be explained. Note that, in the following description, the points different from the above-described embodiments 1-A to 1-E will be explained, and the description considered redundant will be omitted.

Figure 7:
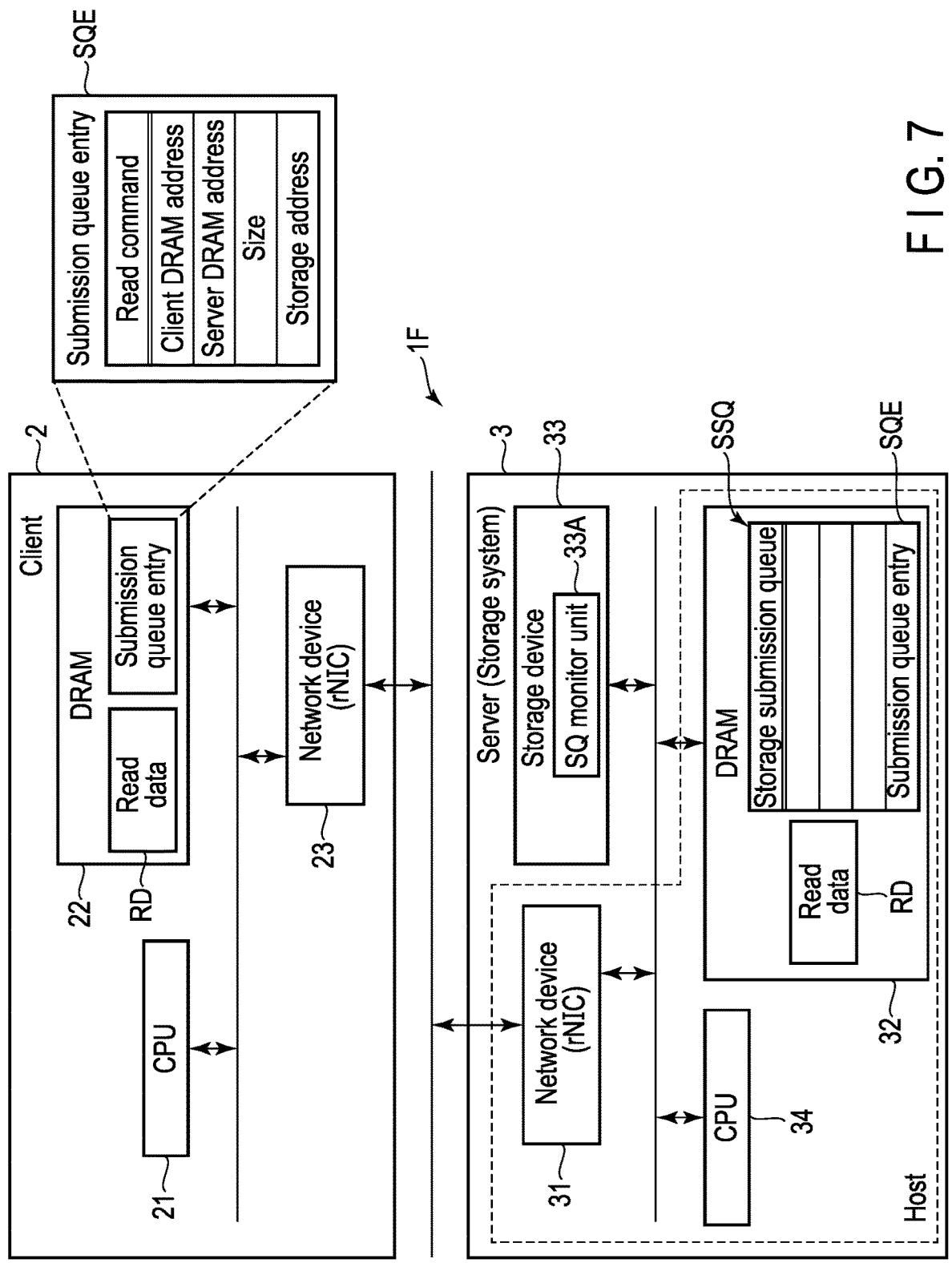
FIG. 7 illustrates an example of the schematic structure of a network storage system of an embodiment 2-A.

FIG. 7 is a diagram illustrating an example of the schematic structure of a network storage system 1F of an embodiment 2-A. As in FIG. 7, the network storage system 1F includes a client 2 and a server 3. The client 2 and the server 3 communicate with each other using remote direct memory access. The communication using remote direct memory access performed between the client 2 and the server 3 may be realized by, for example, Infiniband, RoCE, or iWARP.

The client 2 includes CPU 21, DRAM 22, and network device 23. The components 21 to 23 included in the client 2 are mutually connected by, for example, a bus.

The server 3 includes a network device 31, DRAM 32, storage device 33, and CPU 34. The network device 31, DRAM 32, and CPU 34 function as a host of the storage device 33. The components 31 to 34 included in the server 3 are mutually connected by, for example, a bus. As an interface to mutually connect the host and the storage device 33, PCIe, NVMe, or the like may be used.

Initially, the structure of the client 2 will be explained.

The CPU 21 generates a submission queue entry SQE including a request to the server 3. The submission queue entry SQE includes various commands. In the present embodiment, a case where a read command is included as one of the various commands will be explained.

The read command is a command to read data (read data) from the server 3, and the read command includes, for example, a client DRAM address, size of read data, and storage address. The client DRAM address indicates an address of DRAM 22 included in the client 2, and indicates a position in DRAM 22 in which the read data to be transferred from the server 3 is stored. The server DRAM address indicates an address of DRAM 32 included in the server 3, and indicates a position in DRAM 32 in which the read data to be transferred to the client 2 is temporarily stored. The storage address indicates an address of the storage device 33 included in the server 3, and indicates a position in the storage device 33 where the read data to be transferred to the client 2 is stored.

The DRAM 22 stores a submission queue entry SQE generated by the CPU 21 and read data RD read (transferred) from the server 3 based on a read command included in the submission queue entry SQE.

The network device 23 communicates with the server 3 using remote direct memory access, and transfers the submission queue entry SQE using RDMA to the server 3. Furthermore, the network device 23 communicates with the server 3 and receives read data RD transferred from the server 3.

Now, the structure of the server 3 will be explained.

The network device 31 communicates with the client 2 using remote direct memory access, and receives the submission queue entry SQE transferred from the client 2 using RDMA. The received submission queue entry SQE is stored in the storage submission queue SSQ in the DRAM 32.

Furthermore, the network device 31 communicates with the client 2 and transfers the read data RD to the client 2.

The DRAM 32 includes a storage submission queue SSQ. The storage submission queue SSQ includes a memory area of multiple management units. The storage submission queue SSQ stores the submission queue entry SQE which is transferred using RDMA from the client 2. Furthermore, the DRAM 32 stores the read data RD read from the storage device 33 based on the read command included in the submission queue entry SQE which is transferred using RDMA from the client 2.

The storage device 33 includes an SQ monitor unit 33A. The SQ monitor unit 33A performs polling of the storage submission queue SSQ in the DRAM 32 periodically in order to monitor whether or not a new submission queue entry SQE is stored in the storage submission queue SSQ. In a case where a result of the polling indicates that a new submission queue entry SQE is stored, the SQ monitor unit 33A fetches the read command included in the new submission queue entry SQE and executes a read process based on the read command. Note that the method of polling is described above as in the above-described embodiments 1-A to 1-E, and thus, the detailed description thereof will be omitted.

The CPU 34 acquires a client DRAM address indicated by the read command fetched by the storage device 33. The CPU 34 outputs an instruction to transfer the read data RD read from the storage device 33 to the client 2 to the network device 31. In this example, the instruction output to the network device 31 includes, for example, a server DRAM address indicative of a position on the DRAM 32 where the read data RD is stored, and a client DRAM address.

The network device 31 transfers, based on the instruction from the CPU 34, the read data RD to the client 2.

Note that the read data RD may be transferred using RDMA, or may be transferred using a certain transferring method which is different from the RDMA transfer.

In the following description, a read process executed by the network storage system 1F of the embodiment 2-A with the above-described structure will be explained.

FIG. 8 is a sequence chart illustrating an example of the read process executed by the network storage system 1F of the embodiment 2-A. Note that, in this example, read data RD to be transferred to the client 2 is stored in the storage device 33 of the server 3. Furthermore, in this example, the SQ monitor unit 33A included in the storage device 33 of the server 3 performs polling of the storage submission queue SSQ in the DRAM 32 periodically in order to monitor whether or not a new submission queue entry SQE is stored.

Initially, the CPU 21 of the client 2 generates a submission queue entry SQE including the read command to read data from the server 3 (step S21), and stores the generated submission queue entry SQE in the DRAM 22 (step S22).

Then, the CPU 21 outputs a third transfer instruction to perform RDMA transfer of the generated submission queue entry SQE to the server 3 (step S23). In this example, the third transfer instruction output to the network device 23 includes, for example, a DRAM address indicative of the position in the DRAM 22 where the submission queue entry SQE is stored.

Upon receipt of the third transfer instruction from the CPU 21, the network device 23 performs RDMA transfer of the submission queue entry SQE to the server 3 (step S24).

Upon receipt of the submission queue entry SQE transferred using RDMA from the client 2, the network device 31 of the server 3 stores the received submission queue entry SQE in the storage submission queue SSQ in the DRAM 32 (step S25).

Thereinafter, when the polling is executed by the SQ monitor unit 33A of the storage device 33, the SQ monitor unit 33A detects that a new submission queue entry SQE is stored in the storage submission queue SSQ in the DRAM 32 (step S26).

Upon detection of a new submission queue entry SQE being stored, the SQ monitor unit 33A executes an operation based on the read command included in the new submission queue entry SQE (that is, read process). Specifically, initially, the SQ monitor unit 33A reads the read data RD stored in storage device 33 based on the storage address included in the aforementioned read command (step S27). Then, the SQ monitor unit 33A writes the read data RD in a position of the memory area of the DRAM 32, designated by the server DRAM address included in the aforementioned read command (step S28).

Upon detection of the read data RD being stored in the DRAM 32, the CPU 34 acquires a client DRAM address indicated by the read command. The CPU 34 outputs a fourth transfer instruction to transfer the read data RD stored in the DRAM 32 to the client 2 to the network device 31 (step S29). In this example, the fourth transfer instruction output to the network device 31 includes, for example, the server DRAM address indicative of a position of the DRAM 32 where the read data RD is stored, and the client DRAM address.

Upon receipt of the fourth transfer instruction from the CPU 34, the network device 31 transfers the read data RD to the client 2 (step S30).

Upon receipt of the transferred read data RD from the network device 31 of the server 3, the network device 23 of the client 2 stores the received read data RD in a position of the memory area of the DRAM 22, indicated by a transfer destination memory address designated by the network device 31 (in this example, client DRAM address) (step S31), and ends a series of the read process.

Note that, a method of detecting that the read data RD is stored in the DRAM 32 (in other words, a method of detecting completion of an operation by the storage device 33 based on a read command) will be realized by any conventional methods including, for example, detecting by polling a completion queue in which completion information indicative of completion of an operation based on a read command is stored, detecting update of a value of CQ tail stored in a doorbell tail register, and detecting an interrupt.

In the above-described embodiment 2-A, the network storage system 1F includes the client 2 configured to communicate with the server 3 using remote direct memory access and to transfer the submission queue entry SQE including the read command to the server 3 using RDMA. Furthermore, the network storage system 1F includes the server 3 including the DRAM 32 which includes the storage submission queue SSQ in which the submission queue entry SQE transferred using RDMA from the client 2 is stored, and the SQ monitor unit 33A configured to perform polling in order to monitor whether or not a new submission queue entry SQE is stored in the storage submission queue SSQ.

With the above structure, the server 3 can detect that the submission queue entry SQE transferred using RDMA is stored in the storage submission queue SSQ by polling, and based on the detection, execute a read process based on the read command included in the submission queue entry SQE. Thus, a process normally required, that is, a process of updating a doorbell tail register performed at the time when a submission queue entry SQE is stored in the storage submission queue SSQ can be omitted, and latency can be reduced.

Furthermore, the submission queue entry SQE including the read command executed by the server 3 is generated remotely by the client 2, and the server 3 simply executes the read process based on the read command included in the submission queue entry SQE transferred using RDMA, and thus, for example, a CPU process of changing a request command transmitted from the client 2 for the server 3, and generating a request command for the server 3 can be omitted. That is, the CPU process by the CPU 34 of the server 3 can be reduced.

Note that, as with the above-described embodiments 1-A to 1-E, the network device 23 of the client 2 included in the network storage system 1F and the network device 31 of the server 3 may be structured with standard rNIC which does not have a function to interpret NVEeoF, or may be structured with rNIC which has a function to interpret NVMeoF.

Embodiment 2-B

Now, an embodiment 2-B will be explained. FIG. 9 illustrates an example of the schematic structure of a network storage system 1G of the embodiment 2-B. In the embodiment 2-B, the DRAM 22 of the client 2 includes a receiving queue RQ which stores a client DRAM address while the client DRAM address is omitted from the submission queue entry SQE, and in this respect, the embodiment 2-B is different from the above-described embodiment 2-A. Note that, in the following description, the points different from the above-described embodiment 2-A will be explained, and the description considered redundant will be omitted.

Upon receipt of the read data RD transferred from the server 3, the network device 23 of the client 2 stores the received read data RD in a position designated by the client DRAM address stored in the receiving queue RQ in the DRAM 22.

With the above-described embodiment 2-B, the DRAM 22 of the client 2 includes the receiving queue RQ which can store the client DRAM address, and thus, the client DRAM address can be omitted from the submission queue entry SQE. Thus, the transfer of the client DRAM address from the client 2 to the server 3 can be omitted. Therefore, data amount of the submission queue entry SQE can be decreased, and latency can further be reduced.

Note that, the submission queue entry SQE including the read command executed by the server 3 is generated remotely by the client 2, and the server 3 simply executes the read process based on the read command included in the submission queue entry SQE transferred using RDMA, and thus, the CPU process executed by the CPU 34 of the server 3 can be reduced as with the above-described embodiment 2-A.

Embodiment 2-C

Now, an embodiment 2-C will be explained. FIG. 10 is a diagram illustrating an example of the schematic structure of a network storage system 1H of the embodiment 2-C. In the embodiment 2-C, as in FIG. 10, a storage device 33 of a server 3 includes a first DRAM address storage unit 33D and a DRAM 32 of the server 3 includes a second DRAM address storage unit 32A while a server DRAM address is omitted from a submission queue entry SQE, and in this respect, the embodiment 2-C is different from the above-described embodiment 2-A. In the first DRAM address storage unit 33D and the second DRM address storage unit 32A, a server DRAM address indicative of a position of the DRAM 32 where read data RD read from the storage device 33 is to be stored is stored. Note that the first DRAM address storage unit 33D and the second DRAM address storage unit 32A are initialized to store a server DRAM address of the same value.

Upon detection of the submission queue entry SQE transferred first from the client 2 to the server 3 using RDMA being stored in the storage submission queue SSQ, the storage device 33 of the server 3 reads the read data RD stored in the storage address included in the submission queue entry SQE. The storage device 33 stores the read data RD in a position of the memory area in the DRAM 32, designated by the server DRAM address (initial value) stored in the first DRAM address storage unit 33D. Note that the storage device 33 adds the size of the read data RD included in the first submission queue entry SQE to the server DRAM address stored in the first DRAM address storage unit 33D in order to generate a server DRAM address indicative of a position of the DRAM 32 where read data RD corresponding to a submission queue entry SQE transferred next using RDMA is to be stored. The generated server DRAM address is stored by updating the server DRAM address stored in the first DRAM address storage unit 33D.

Upon detection of the read data RD corresponding to the first submission queue entry SQE being stored in the DRAM 32, the CPU 34 outputs to the network device 31, an instruction to transfer the read data RD stored in the position designated by the server DRAM address (initial value) stored in the second DRAM address storage unit 32A to the client 2. Note that, CPU 34 adds the size of the read data RD included in the first submission queue entry SQE to the server DRAM address stored in the second DRAM address storage unit 32A in order to generate a server DRAM address indicative of a position of the DRAM 32 where read data RD corresponding to a submission queue entry SQE transferred next using RDMA is to be stored. The generated server DRAM address is stored by updating the server DRAM address stored in the second DRAM address storage unit 32A.

The storage device 33 of the server 3 updates the server DRAM address stored in the first DRAM address storage unit 33D by operating similarly when the read data RD corresponding to the submission queue entries SQE transferred using RDMA are read in second and subsequent cases. Furthermore, the CPU 34 updates the server DRAM address stored in the second DRAM address storage unit 32A by operating similarly when the read data RD corresponding to the submission queue entries SQE transferred using RDMA are read in second and subsequent cases. Therefore, the server DRAM address stored in the first DRAM address storage unit 33D and the server DRAM address stored in the second DRAM address storage unit 32A can be constantly set to the same value.

With the above-described embodiment 2-C, the server 3 can specify, based on the server DRAM address stored in the first DRAM address storage unit 33D and the second DRAM address storage unit 32A and the size of the read data RD included in the received submission queue entry SQE, the server DRAM address of the read data RD corresponding to the submission queue entry SQE transferred next using RDMA. Thus, transfer of a server DRAM address can be omitted from the submission queue entry SQE, and transfer of the server DRAM address from the client 2 to the server 3 can be omitted. Therefore, data amount of the submission queue entry SQE can be decreased, and latency can further be reduced.

Note that, the submission queue entry SQE including the read command executed by the server 3 is generated remotely by the client 2, and the server 3 simply executes the read process based on the read command included in the submission queue entry SQE transferred using RDMA, and thus, the CPU process executed by the CPU 34 of the server 3 can be reduced as with the above-described embodiment 2-A.

According to the above-described embodiments 2-A to 2-C, a network storage system 1 which can transfer the data stored in the server 3 to the client 2 with efficiency can be achieved.

According to at least one of the above-described embodiment, the network storage system 1 includes the server 3 which can detect that a submission queue entry SQE transferred using RDMA is stored in the storage submission queue SSQ by polling, and based on the detection, execute a process based on a command included in the submission queue entry SQE. Therefore, the network storage system 1 which can facilitate the communication between the client 2 and the server (storage system) 3 can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a network interface controller configured to communicate with a client using remote direct memory access;
a volatile memory; and
a storage device, wherein
the network interface controller is configured to store write data and a submission queue entry including a write request of the write data transferred using the remote direct memory access in the volatile memory, the submission queue entry being stored in a submission queue in the volatile memory,
the storage device is configured to write, when the submission queue entry is stored in the submission queue of the volatile memory, the write data to the storage device based on the submission queue entry,
the submission queue includes a memory area of multiple management units,
the submission queue includes bit information set per memory area of the multiple management units,
the bit information is updated when the submission queue entry is stored in the submission queue,
the storage device is configured to detect whether or not the submission queue entry is stored in the submission queue by monitoring whether or not the bit information is updated, by polling the submission queue periodically,
the submission queue entry includes a size of the write data, and
the storage device is configured to retain a memory address which is an address of the volatile memory and is indicative of a write destination of the write data transferred from the client, write the write data to the volatile memory based on the memory address, and generate and retain a new memory address indicating a write destination of write data to be next transferred from the client by adding a size of the write data to the memory address.

2. The storage system of claim 1, wherein
the submission queue entry includes a storage address indicative of a write destination of the write data, and
the storage device is configured to write the write data in a position designated by the storage address included in the submission queue entry.

3. The storage system of claim 1, wherein the storage device is configured to monitor the submission queue, and detect that the submission queue entry is stored in the submission queue.

4. The storage system of claim 1, wherein
the storage device is configured to detect that the submission queue entry is stored in the submission queue when the bit information is updated.

5. The storage system of claim 1, wherein
the storage device is configured to detect, when detecting completion of the communication with the client using the remote direct memory access, that the submission queue entry is stored in the submission queue.

6. The storage system of claim 1, further comprising a detector configured to detect whether or not the submission queue entry is stored in the submission queue.

7. A storage system comprising:
a network interface controller configured to communicate with a client using remote direct memory access;
a volatile memory;
a storage device; and
a processor, wherein
the network interface controller is configured to store a submission queue entry including a read request of data stored in the storage device, which is transferred using the remote direct memory access in the volatile memory, the submission queue entry being stored in a submission queue in the volatile memory,
the storage device is configured to read, when the submission queue entry is stored in the submission queue in the volatile memory, read data as a read target based on the submission queue entry,
the processor is configured to output to the network interface controller, an instruction to transfer the read data to the client,
the submission queue includes a memory area of multiple management units,
the submission queue includes bit information set per memory area of the multiple management units,
the bit information is updated when the submission queue entry is stored in the submission queue,
the storage device is configured to detect whether or not the submission queue entry is stored in the submission queue by monitoring whether or not the bit information is updated, by polling the submission queue periodically,
the submission queue entry includes a size of the read data, and
the storage device is configured to retain a memory address which is an address of the volatile memory and is indicative of a write destination of the read data transferred to the client, read the read data, write the read data to the volatile memory based on the memory address, and generate and retain a new memory address indicating a write destination of read data to be next transferred to the client by adding a size of the read data to the memory address.

8. The storage system of claim 7, wherein
the submission queue entry includes a storage address indicative of a storage destination of the read data, and
the storage device is configured to read the read data from a position designated by the storage address included in the submission queue entry.

9. The storage system of claim 7, wherein the storage device is configured to monitor the submission queue and detect that the submission queue entry is stored in the submission queue.

10. The storage system of claim 7, wherein
the storage device is configured to detect, when the bit information is updated, that the submission queue entry is stored in the submission queue.

11. The storage system of claim 7, wherein the storage device is configured to detect, when completion of the communication with the client using the remote direct memory access is detected, that the submission queue entry is stored in the submission queue.

12. The storage system of claim 7, wherein
the submission queue entry includes a memory address which is an address of the volatile memory and is indicative of a write destination of the read data, and
the storage device is configured to write the read data in a position designated by the memory address included in the submission queue entry.

13. The storage system of claim 7, wherein
the submission queue entry includes a client address indicative of a write destination of the read data, and
the processor is configured to output to the network interface controller, an instruction to transfer the read data and the client address to the client.
14. The storage system of claim 7, wherein
the client includes a receiving queue for storing a client address indicative of a write destination of the read data, and
the read data is written to a position designated by the client address stored in the receiving queue.

\* \* \* \* \*